July 11, 1944.  H. F. ROST ET AL  2,353,503
DEVICE FOR AUTOMATICALLY COMPENSATING EFFECT
OF CENTRIFUGAL FORCES ON VEHICLES
Filed Feb. 21, 1940   4 Sheets-Sheet 1

INVENTORS
Helge Fabian Rost
Knut Julius Lindblom
their ATTY.

July 11, 1944.  H. F. ROST ET AL  2,353,503
DEVICE FOR AUTOMATICALLY COMPENSATING EFFECT
OF CENTRIFUGAL FORCES ON VEHICLES
Filed Feb. 21, 1940  4 Sheets-Sheet 2

Helge Fabian Rost
Knut Julius Lindblom
INVENTORS their ATTY.

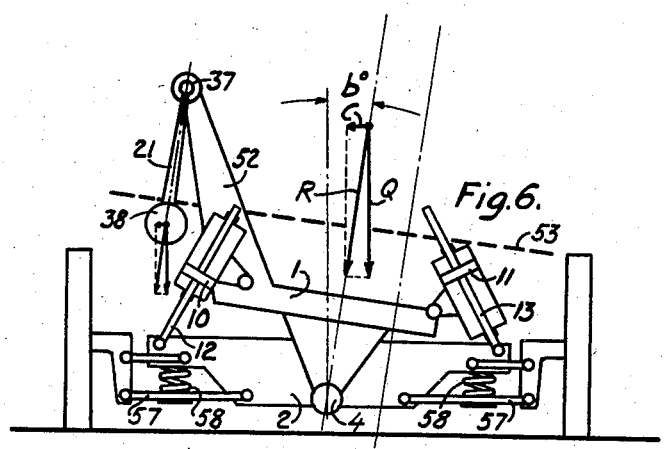
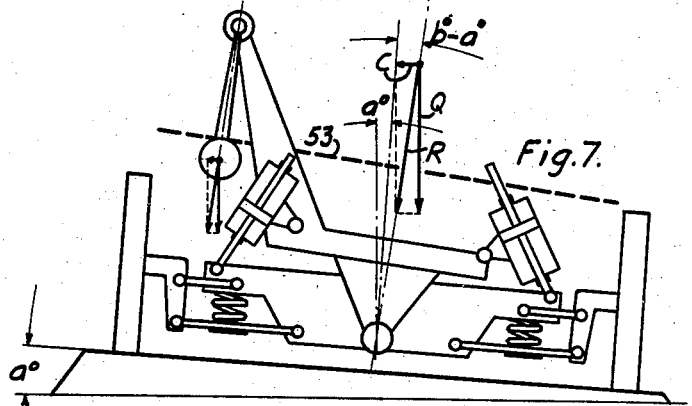
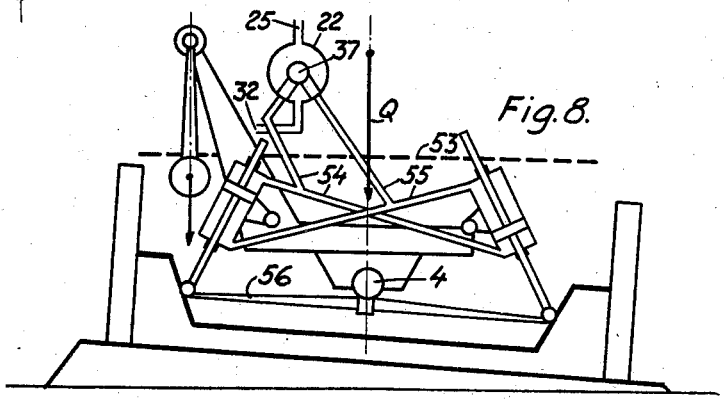

July 11, 1944.    H. F. ROST ET AL    2,353,503
DEVICE FOR AUTOMATICALLY COMPENSATING EFFECT
OF CENTRIFUGAL FORCES ON VEHICLES
Filed Feb. 21, 1940    4 Sheets-Sheet 4

INVENTORS
Helge Fabian Rost
Knut Julius Lindblom
By Otto Munk
their ATTY.

Patented July 11, 1944

2,353,503

UNITED STATES PATENT OFFICE 2,353,503

DEVICE FOR AUTOMATICALLY COMPENSATING EFFECT OF CENTRIFUGAL FORCES ON VEHICLES

Helge Fabian Rost, Djursholm, and Knut Julius Lindblom, Tureberg, Sweden

Application February 21, 1940, Serial No. 320,006
In Sweden February 1, 1939

11 Claims. (Cl. 280—112)

The present invention relates to a device for all kinds of vehicles which device accomplishes an automatic compensation or elimination of the effect of the centrifugal or lateral forces acting on a vehicle body or load when passing through a curve.

The invention refers to a device for vehicles of high velocities, particularly automobiles, motor cars, trailers and the like, but the invention can also be used on vehicles conducted on rails, for example railroad cars and locomotives.

The invention is particularly useful when the velocity of the vehicle is higher or lower than that for which the superelevation of the corresponding road bed has been constructed.

The object of the invention is to conduct the vehicles in curves so that the occupants of the vehicle will not have the unpleasant sensation that they are on the verge of being thrown out at the curve as heretobefore has been the case when a curve is being rounded in a known vehicle at high speed. The invention serves equally well at any possible speed, for any superelevation and radius of curve.

A curve is normally given a certain superelevation in order to counteract the effect of the centrifugal force on the vehicle and on objects and persons transported therein, when said vehicle with a certain predetermined speed passes through the curve.

If, for example, a railroad curve is correctly superelevated for a velocity of 90 kilometers per hour, that is, if a railroad train is conducted at the indicated velocity through the curve, the resultant of the centrifugal force and of the gravity acting on a passenger or on an object is kept at right angle to the floor of the vehicle or to the road bed. In such a case a person does not feel any sensation of being thrown out of the curve or of falling inward if the vehicle is conducted at a speed lower than that corresponding to the actual superelevation.

If, however, the train were to be conducted through the curve at a speed of 120 km./hour the superelevation must be changed so as to correspond to the higher speed, if no bad effects should be experienced. The same difficulties are experienced with respect to highways and motor vehicles. A one-track vehicle, for example a bicycle, is given the proper inclination. independent of the superelevation of the road, but this has not been possible heretofore with respect to a vehicle provided with 4 or more wheels arranged in pairs.

The object of the invention is accomplished by automatically tilting the body and load toward the center of the curve when passing same so that the resultant of the centrifugal and gravity forces will aways be kept at a right angle to the floor of the vehicle body. This tilting is accomplished by means of specially arranged and constructed supports for the vehicle body which cause such a degree of tilting of said body with respect to the wheel axle systems that corresponds to the correct superelevation for a certain velocity, even if the curve should be provided with a superelevation corresponding to a lower velocity.

The invention is primarily characterised by the combination with a vehicle body, having a front and a rear axle system supporting wheels and spring means operatingly connecting the axle systems and the body with the supporting wheels, of a central laterally hinged support on each axle system by means of which the body along its longitudinal axis is tiltingly connected to said axle systems, of a number of cylinders and corresponding pistons, movably connecting the sides of said body with at least one of the said axle systems, and of a pendulum and combined valve, said pendulum upon actuation by the centrifugal and gravity forces being arranged to operate said valve to allow a pressure medium to pass to said cylinders until the vehicle body has obtained such an inclination with respect to said axle systems that the pendulum remains substantially at right angles to the floor of the body at various velocities and super-elevations.

In certain embodiments of the invention the device also serves as a shock absorber.

The invention will be fully understood in connection with the accompanying drawings of which:

Fig. 6 is a diagrammatic vertical section of an axle system of an automobile, travelling through a right hand non-superelevated curve.

Fig. 7 is a diagrammatic vertical section of an axle system of an automobile travelling in a right hand superelevated curve.

Fig. 8 is a diagrammatic vertical section of an axle system of an automobile standing in a superelevated curve. This figure embodies the combined principle of the device acting as a shock absorber and as an automatic tilting device.

Figure 1:
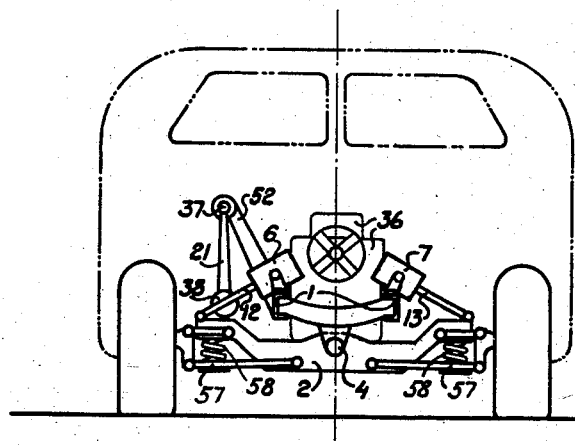
Fig. 1 is a vertical front view of an automobile, showing the front axle system with the tilting device.
Figure 2:
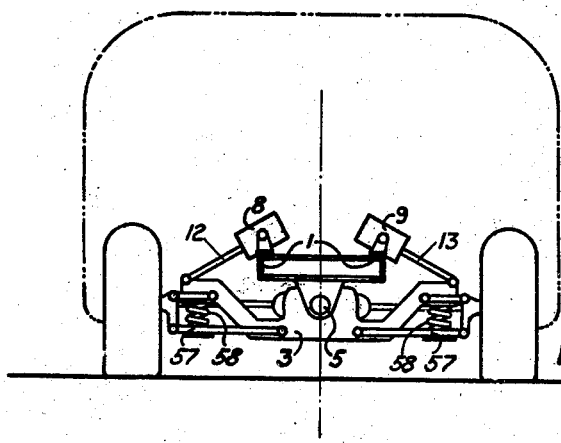
Fig. 2 is a vertical diagrammatical sectional front view showing the rear axle system with its tilting device as shown in Fig. 1.
Figure 9:
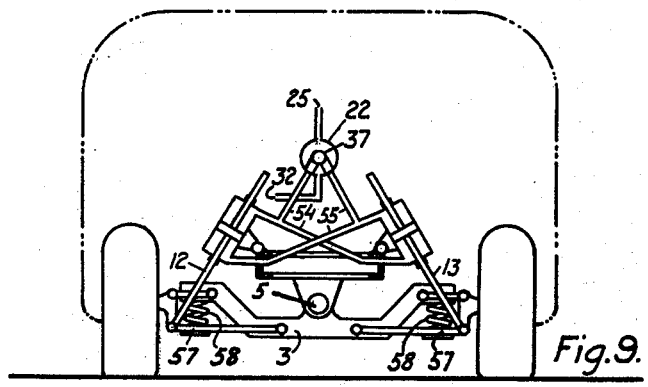
Fig. 9 is a vertical front view of an automobile showing the combined principles of the invention, acting as automatic tilting device and, at the same time, as a shock absorber.

In Figs. 1-5 1 is the frame. 2 is the front axle system. 3 is the rear axle system. In Fig. 1 and Fig. 2 the wheels are provided with individual spring actions. 4 is a horizontal shaft or universal joint around which the chassis can be tilted laterally at right angles to the longitudinal axis of axle 2. 5 is a similar arrangement for the rear axle system 3. 6 and 7 are cylinders attached to the frame and cooperating with the front axle system. 8 and 9 are similar cylinders attached to the frame cooperating with the rear axle system. 10 and 11 are pistons movable inside the cylinders 6 and 7, 8 and 9. 12 and 13 are piston rods that by means of hinge-like arrangements are fixed to respective pistons and axle systems. These piston rods can be directly attached to the axles 2 or 3 as shown in Fig. 1 and Fig. 2 or the rods can be attached to the bridges 57, supporting the springs 58. In the latter case the pistons can simultaneously act as shock absorbers and as automatic tilting devices as shown in Fig. 9.

In Fig. 1 21 is a pendulum with a weight 38 that can be turned about the shaft 37 which by means of arm 52 is fixedly attached to the car body or its frame 1.

Figure 3:
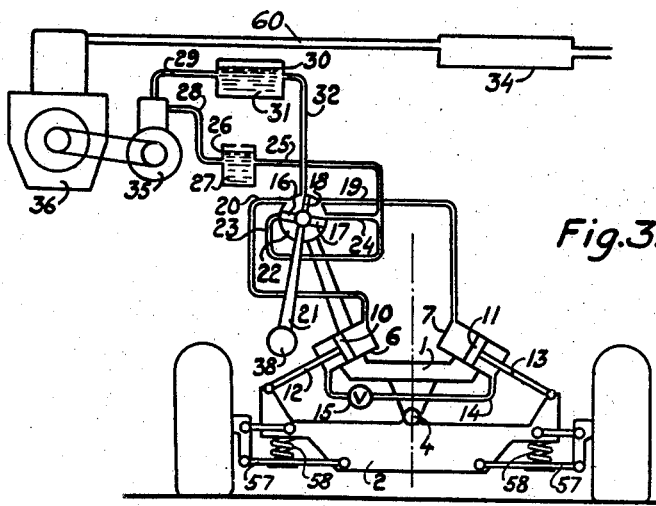
Fig. 3 is a diagrammatical vertical front view of one of the axle systems, showing connections of cylinders, pistons, pendulum and valve for the direction of a pressure medium to the cylinders in the moment the automobile is passing into a right hand non-superelevated curve.

In the diagrammatical Fig. 3 showing the tilting principle of the invention 21 is said pendulum. 22 is a valve directing a pressure medium, for example oil or air, to the cylinders 6 or 7. 35 is a compressor or pump arrangement that from the container 26 receives the pressure medium 27, to be compressed in the container 30, from which it is directed to respective cylinders through the valve 22. The pump arrangement or the compressor is operated in this case by the motor 36. Exhaust pipe 60 connects the motor 36 with silencer 34.

Figure 4:
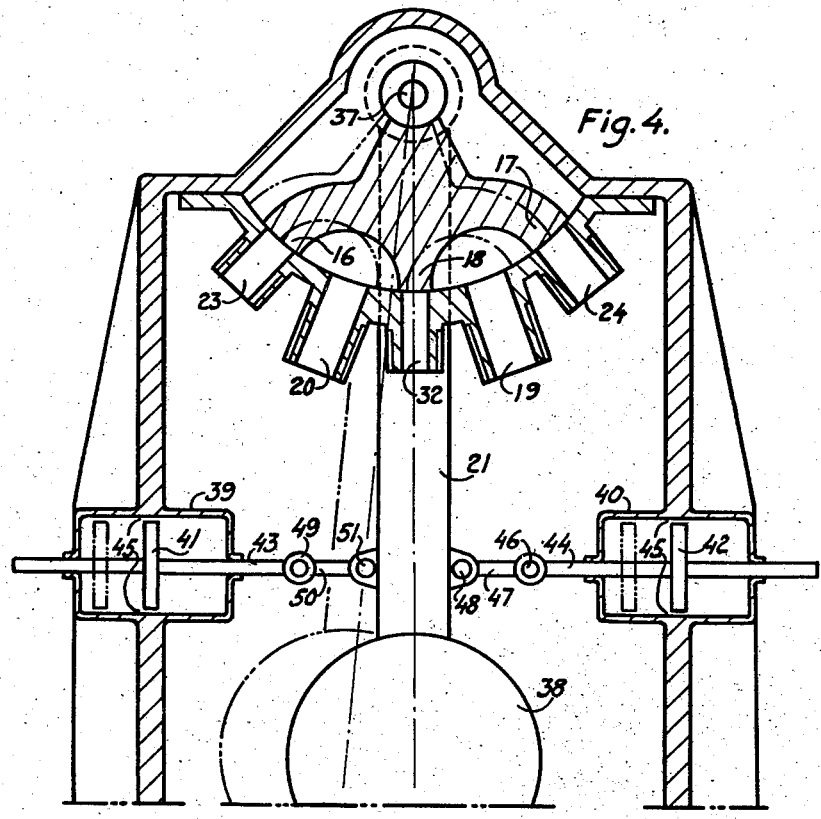
Fig. 4 is a vertical partly sectional view of the pendulum and valve for the automatic control of the pressure fluid to and from the cylinders.
Figure 5:
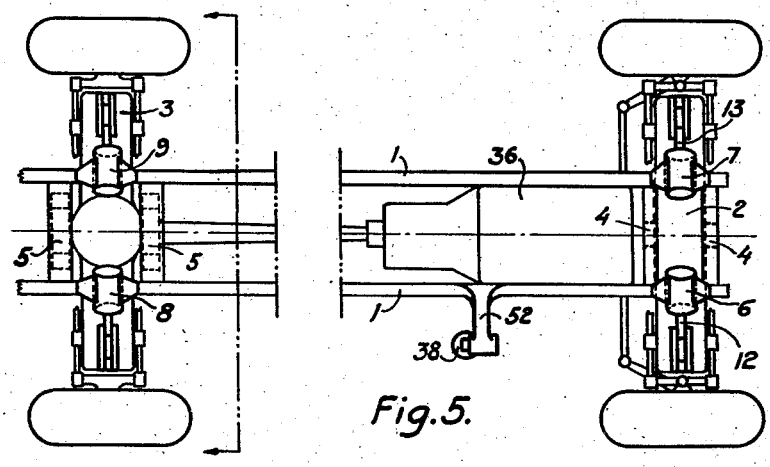
Fig. 5 is a horizontal projection of an automobile frame provided with the tilting device.

Fig. 4 shows in detail the construction of valve 22 (Fig. 3). 37 is a shaft attached to the body or the frame of the car. The pendulum 21 and weight 38 are turnable about said shaft 37. The valve arms 16, 17 and 18 (Figs. 1-4) direct the pressure medium (31) by pipes 32 and 20 to cylinders 6 and 8 or by pipes 32 and 19 to the cylinders 7 and 9, depending upon if the pendulum moves to the left or to the right.

The pendulum can be provided with damping arrangements, for example air- or oil-damping devices as shown in Fig. 4, whereby the pistons 41 and 42 moving in cylinders 39 and 40 are connected by rods and joints 43, 49, 50, 51 and 44, 46, 47 and 48 respectively with the pendulum 21. Instead of making holes in the pistons a circular opening 45 can be left between the piston and the cylinder walls.

Figs. 6 and 7 show diagrammatically the general principles of the invention. 53 is the floor of the vehicle body, being parallel to the frame 1. Figs. 6 and 7 show a vehicle passing through curves of the same radius, the curve in Fig. 6 being non-superelevated, while the curve in Fig. 7 is superelevated with the angle (a°). Q is the weight of the vehicle body, its chassis and load. C is the centrifugal force acting on said weight. R is the resultant of Q and C.

In Fig. 6 (b°) is the angle that the resultant R forms with the vertical plane so that a passenger should feel no influence from the centrifugal force, the resultant R in such a case being at right angle to the floor of the body.

If the road bed is superelevated with the angle (a°), as shown in Fig. 7, the direction of the resultant with respect to the vehicle plane is unchanged (b°), but the angle between the axle system with respect to the floor of the body will in such a case be only (b°—a°). That means that the floor of the body is less inclined with respect to the axle systems than it would be on a horizontal road of the same radius and at the same speed.

The device operates in the following way: A compressor 35 is driven from motor 36. The compressed air or oil is pumped from receptacle 26 through pipes 28 and 29 to container 30, where air or oil is kept at constant pressure in known way.

If the vehicle is moving at a certain speed in a curve to the right, the pendulum 21 with its weight 38 moves to the left as shown in Fig. 3, whereby the fingers 18, 16 and 17 of the valve 22 are moved and so placed with respect to the pipes 32, 19, 20, 23 and 24 that the pressure pipe 32 by way of pipe 20 is connected to the upper part of the cylinder 6. Simultaneously the upper part of the cylinder 7 is by pipe 24 and 25 connected to the container 26.

Upon increase of pressure in cylinders 6 and 8 the piston 10 is moved downward. Below respective pistons there should also be a medium preferably of the same kind as on the upper side of the piston. The lower parts of the cylinders can in certain cases be interconnected by means of a pipe so that the pressure medium can flow from the lower part of one cylinder to the lower part of the opposite cylinder, said pipe being provided with a valve 15 for locking the system if so desired.

According to one embodiment of the invention as shown in Fig. 8, instead of interconnecting the lower parts of the cylinder interconnections by means of pipes are made between the upper part of one cylinder to the lower part of the opposite cylinder and vice versa. By this arrangement the devices according to the invention will fulfill the double purpose of acting as shock absorbers and as a tilting device. When the piston 10 is brought down (Fig. 3) the piston 11 of cylinder 7 is brought up, whereby the pressure medium in the upper part of the cylinder 7 flows through pipe 19 and 24 to the container 26 or into the free air. Hereby the body and its chassis is tilted to the right until a certain angle is obtained between the axle systems and said chassis, or until the body has been tilted sufficiently so that the valve finger 18 is exactly in front of the valve opening 32. The pressure medium is then shut off from the cylinder 6 and the relative movement between the chassis and the axle system is stopped. The pendulum will then be at right angle to the chassis of the body. When the pendulum upon change of direction of the vehicle once has made a definite inclination with respect to the vertical plane for a certain velocity, the obtained angle is being kept constant until the body has been tilted so much that the pendulum once more is located at right angle to the chassis, in which case the pressure pipe has been shut off from the respective cylinders.

When the curve has been passed and the action of the centrifugal force on the pendulum has ceased, the pendulum gradually returns to the vertical position, whereby the valve fingers 18, 17 and 18 move to the left with respect to valve openings 12, 19, 20, 23 and 24. Hereby the pressure pipe 32 by means of pipe 19 is placed in connection to the upper part of the right hand cylinder 7 and the piston 11 moves down until balance is obtained, when the pressure pipe 32 is again shut off by the valve finger 18. When the vehicle passes to the left, similar conditions are registered.

Should the vehicle stop in a superelevated curve and therefore the centrifugal force cease, the pendulum places itself vertically and the vehicle body places itself horizontally as shown in Fig. 8.

In Fig. 8, 54 and 55 are pipes crosswise connecting the upper and lower parts of opposite cylinders. 56 is a transversal blade spring, in the center of which the hinged joint 4 is fixed, and about which the chassis can laterally tilt. Independently of the tilting the cylinders serve as shock absorbers, as readily can be seen in Fig. 8.

The device works as a shock absorber in the following way: If the left hand wheel in Fig. 8 jumps up, the left piston moves upward and the pressure medium above the left piston moves partly through pipe 54 to the lower part of the right cylinder. Simultaneously the right piston is moved upward and the pressure medium above the piston in the right hand cylinder is passed correspondingly through pipe 55 to the lower part of the left cylinder. By choosing the diameters of pipes 54 and 55 or by introducing suitable shock absorbing valves in these pipes, a nice and smooth movement of the vehicle is obtained.

If both wheels simultaneously are suddenly lowered or raised the pressure medium in the upper parts of both cylinders is gradually passed to the corresponding opposite lower parts of the cylinders in the same way as previously described.

The same shock absorbing action will be obtained on cars provided with a spring system as shown in Fig. 1 and Fig. 2, if the piston rods are attached to the lower bridges 57 instead of being directly fixed to the axle 2 or 3, the springs 58 resting on said bridges 57, as shown in Fig. 9.

According to this invention an automatic shock absorbing action and simultaneously an automatic inclination of the body is obtained to entirely counteract the effect of the centrifugal force in curves and at any possible velocity.

A vehicle provided with a device according to the invention moves just as ideally as a bicycle and is independent of velocity, curve radii and super-elevation.

Figure 10:
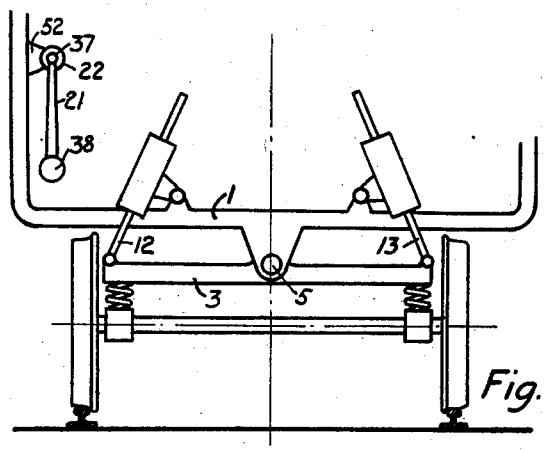
Fig. 10 is a vertical front view of a railway car according to the invention.

Fig. 10 illustrates the invention as applied to a railroad car, a similar construction as that shown in Figs. 1 to 3 being used, with the only difference that railroad wheels on rails are used instead of rubber wheels.

Instead of rubber tires railroad wheels can be used as indicated by the dotted lines in Figs. 2 and 3.

Apart from the above mentioned important improvement in the elimination of the effects of the centrifugal forces and eventually combined with an efficient shock absorbing action, the following indirect advantages are obtained:

1. The wheels on both sides of the vehicle receive the same pressure when passing through a curve, because the resultant of the gravity and centrifugal forces as shown in Figs. 6–8 passes substantially half-way between the wheels. In this way the tires on an automobile are equally loaded in a curve.

On automobiles the outside wheels in a curve have heretofore been heavily pressed down, due to the fact that through the centrifugal force the resultant has been allowed to fall toward the outside wheel with the corresponding unequal load on the inner and the outside wheels.

2. The maintenance of high roads in curves can be considerably lowered, due to the fact that the road bed will be equally worn by the inside and outside wheels of a vehicle that is provided with a device according to this invention, said wheels in such a case being equally loaded.

Having now particularly described and ascertained the nature of our said invention and in what manner the same is to be performed, we declare that what we claim is:

1. The combination with a vehicle body, having a front and rear axle system supporting wheels and spring means operatively connecting the axle systems and the body with the supporting wheels, of a central support on each axle system by means of which the body along its longitudinal axis is tiltingly connected to said axle systems, of a number of cylinders and corresponding pistons, movably connecting the sides of said body with at least one of the said axle systems, and of a pendulum with directly combined valve attached to the tiltable body, the valve openings of said valve being adapted to allow a pressure medium, upon actuation of said pendulum by the centrifugal and gravity forces to pass to said cylinders only until the vehicle body has obtained such an inclination with respect to said axle system that the pendulum remains substantially at right angles to the floor of the body at any superelevation, said cylinders with corresponding pistons being located on each side of said central support on at least one of the axle systems, the upper parts of two opposite cylinders being crosswise connected to the lower parts of the said opposite cylinders in order to obtain a tilting of the body towards the center of a curve when passing same and to obtain a shock absorbing action combined with said tilting operation.

2. In combination a vehicle body, front and rear axle wheel systems, the center of each axle system tiltingly supporting said body, cylinder and piston assemblies interposed between the axle systems and the body to tilt the latter towards the center of a curve when passing same, a source of pressure medium, and valve means with directly controlling pendulum, both attached to the body to regulate the admission of pressure medium to said assemblies, until the pendulum upon being actuated relative to the tiltable body by the resultant action of the centrifugal and gravity forces is in a position at right angles to the floor of the body.

3. In combination a vehicle body, front and rear axle wheel systems, the center of each axle system tiltingly supporting said body, a number of cylinders and corresponding pistons movably interposed between said body and at least one of the axle systems to laterally control the tilting of the body at any superelevation towards the center of a curve when passing same, a pressure medium source, and a pressure medium valve and directly controlling pendulum attached to the body and laterally movable with respect to the longitudinal axis of the body, said valve to admit pressure medium to the cylinders until the pendulum upon being actuated relative to the tiltable body by the resultant action of the centrifugal and gravity forces is in a position at right angles to the floor of the body.

4. In combination a vehicle body, front and rear axle systems, the center of each axle system tiltingly supporting said body, a cylinder and corresponding piston on each side of the center of at least one of the axle systems, the upper parts of opposite cylinders being crosswise connected to the lower parts of the same, a source of pressure medium, and valve means directly controlled by a pendulum attached to the body to regulate the admission of pressure medium to said cylinders until the pendulum upon being actuated relative to the tiltable body by the resultant action of the centrifugal and gravity forces is in a position at right angles to the floor of the body, in order to obtain a tilting of the body towards the center of a curve when passing same and to obtain a shock absorbing action combined with or independent of the tilting operation.

5. In combination a vehicle body, front and rear axle wheel systems, the center of each axle system tiltingly supporting said body, spring means inserted between the body and the respective wheels, cylinders and corresponding pistons also inserted between the body and said wheels of at least one of the axle systems, the upper parts of opposite cylinders being crosswise connected to the lower parts of the same, a source of pressure medium and valve means directly controlled by a pendulum and weight attached to the body to regulate the admission of pressure medium to the upper and lower parts of said cylinders until the pendulum upon being actuated relative to the tiltable body by the resultant action of the centrifugal and gravity forces is in a position at right angles to the floor of the body, in order to obtain a tilting of the body towards the center of a curve when passing same and to obtain a shock absorbing action combined with said tilting operation.

6. In a vehicle, a front axle, a rear axle, a platform longitudinally pivoted to said front and rear axles, said platform forming the vehicle floor and being adapted to laterally tilt with respect to said axles, each axle carrying a pair of wheels, a pair of front cylinders and a pair of rear cylinders secured to said platform, a plunger movably disposed in and cooperating with each cylinder, the outer end of each plunger being operatively connected to one of said wheels, first conduit means associated with the front cylinders, second conduit means associated with said rear cylinders, said first conduit means connecting the upper part of each front cylinder to the lower part of the other front cylinder, and said second conduit means connecting the upper part of each rear cylinder to the lower part of the other rear cylinder, a valve chamber immovably secured to said platform, said valve chamber being provided with inlet and outlet means, third conduit means connecting said outlet means with said first and second conduit means, whereby said cylinders and conduit means, when containing a fluid, will produce a shock absorber effect, a pendulum freely supported by said platform and associated with said valve chamber, said pendulum being adapted to freely oscillate, closure means forming an integral part of said pendulum, said closure means movably disposed in said valve chamber and adapted to close said outlet means, whereby upon oscillation of said pendulum, said closure means is moved inside said valve chamber to open or close said outlet means, and means for supplying a fluid under pressure to said valve inlet means, whereby, when the vehicle speeds through a curve, the centrifugal force displaces the pendulum to open said inlet means and pass fluid under pressure to the respective plungers which will laterally tilt the platform with respect to said axles, whereby said platform is banked without tilting the axles and wheels.

7. The device claimed in claim 6, in which said outlet means comprises a first outlet and a second outlet, and said third conduit means comprises a first conduit and a second conduit, said first conduit connecting said first outlet to the upper part of said first conduit means and said second conduit connecting said second outlet to the upper part of said second conduit means, and in which said closure means comprises a pair of spaced closing elements, said pendulum being disposed between and integrally attached to said closing elements.

8. The device claimed in claim 6, in which said pendulum is provided with damping means in order to steady the operation of the pendulum.

9. In a vehicle, supporting means, a ground wheel carried by said supporting means, a platform pivotally supported by said supporting means and adapted to tilt relative thereto, a cylinder secured to said platform, a plunger movably disposed in said cylinder and operatively connected to said supporting means, a valve chamber immovably secured to said platform, said valve chamber being provided with inlet and outlet means, conduit means connecting said outlet means with said cylinder, conveying means connected to said inlet means to supply fluid under pressure to said valve chamber, a pendulum freely supported by said platform and adapted to oscillate, closure means forming an integral part of said pendulum, said closure means being movably disposed in said valve chamber and adapted to close said outlet means, whereby upon oscillation of said pendulum, said closure means is moved inside said valve chamber to open or close said outlet means to shut off the fluid under pressure from or admit same to said cylinder to actuate said plunger, whereby, depending upon the position of said pendulum, said plunger tilts said platform toward or away from said supporting means.

10. A vehicle as claimed in claim 6, in which each wheel is provided with supporting means, the latter being pivotally secured to said axles, whereby each wheel can move in a vertical plane relative to its axle, independently of any other wheel, and spring means associated with each wheel and interposed between each of said wheel supporting means and said axles, each of the outer ends of said plungers being secured to one of said supporting means, whereby said shock absorbing action is performed both by said spring means and said cylinders, the latter producing simultaneously a banking effect as described.

11. A vehicle as claimed in claim 6, in which each axle includes a leaf spring and said platform is pivotally secured to the center of each of said leaf springs.

HELGE FABIAN ROST.
KNUT JULIUS LINDBLOM.